United States Patent
Henley

(10) Patent No.: US 10,376,806 B1
(45) Date of Patent: Aug. 13, 2019

(54) BUCKING CHUTE WITH SIDE PANELS HAVING RIDER CLEARANCES

(71) Applicant: Ronnie Henley, St. Louis, MO (US)

(72) Inventor: Ronnie Henley, St. Louis, MO (US)

( * ) Notice: Subject to any disclaimer, the term of this patent is extended or adjusted under 35 U.S.C. 154(b) by 0 days.

(21) Appl. No.: 16/267,560

(22) Filed: Feb. 5, 2019

Related U.S. Application Data

(63) Continuation of application No. 16/108,608, filed on Aug. 22, 2018.

(51) Int. Cl.
*A01K 15/04* (2006.01)
*A01K 1/06* (2006.01)
*A63K 3/02* (2006.01)

(52) U.S. Cl.
CPC .............. *A63K 3/02* (2013.01); *A01K 1/0613* (2013.01); *A01K 15/04* (2013.01)

(58) Field of Classification Search
CPC ...... A01K 1/0613; A01K 15/00; A01K 15/04; A01K 1/0606; A01K 1/062; A63K 3/00
USPC .......................................... 119/751, 712, 732
See application file for complete search history.

(56) References Cited

U.S. PATENT DOCUMENTS

| | | | |
|---|---|---|---|
| 2,438,322 A | 3/1948 | McDonough | |
| 3,451,377 A * | 6/1969 | Padgett | A01K 15/04 119/520 |
| 3,720,187 A * | 3/1973 | McDonough | A01K 1/0613 119/734 |
| 4,055,148 A | 10/1977 | Brockman et al. | |
| 4,214,555 A * | 7/1980 | Sawby | A01K 1/0613 119/723 |
| 5,184,572 A * | 2/1993 | Meier | A01K 1/0613 119/733 |
| 6,425,351 B1 * | 7/2002 | Mollhagen | A01K 1/0613 119/733 |
| 7,225,759 B2 | 6/2007 | Kerns | |
| 7,444,961 B1 | 11/2008 | Ellis | |
| 8,307,788 B2 | 11/2012 | Swires | |
| 9,113,611 B1 | 8/2015 | Cain | |
| 9,259,009 B2 * | 2/2016 | Callicrate | A22B 1/00 |
| 2004/0168652 A1 | 9/2004 | Priefert | |
| 2005/0132978 A1 | 6/2005 | Bentz | |
| 2009/0081404 A1 | 3/2009 | Liles | |
| 2010/0083908 A1 | 4/2010 | Brown et al. | |

OTHER PUBLICATIONS

Hi-Hog Farm and Ranch Equipment Product Guide, Jan. 2018, 27 pages.
Priefert Fair, Expo and Rodeo Equipment Catalog, Sep. 2017, 19 pages.
Red River Arenas Bucking Arena Instruction Manual, 2013, 7 pages.
Tarter Farm and Ranch Equipment Product Catalog Eastern Region, Aug. 2016, 132 pages.

(Continued)

*Primary Examiner* — Yvonne R Abbott-Lewis
(74) *Attorney, Agent, or Firm* — Thompson Coburn LLP

(57) ABSTRACT

The present invention provides a bucking chute with side panels that include clearance portions adjacent to the legs of a rider of a rodeo animal. The clearance portions provide clearance space for the legs of the rider in order to reduce the likelihood of injury to the rider while the rider is mounted on the rodeo animal in the chute prior to the start of the rodeo event.

12 Claims, 4 Drawing Sheets

(56) References Cited

OTHER PUBLICATIONS

Tarter Farm and Ranch Equipment Product Catalog Western Region, Aug. 2016, 112 pages.
The Big Blue Book of Priefert Farm, Ranch, and Rodeo Catalog, Jan. 2018, 17 pages.

* cited by examiner

BUCKING CHUTE WITH SIDE PANELS HAVING RIDER CLEARANCES

RELATED APPLICATION DATA

This application is a continuation of U.S. application Ser. No. 16/108,608 filed on Aug. 22, 2018, currently pending, the disclosure of which is incorporated by reference herein.

BACKGROUND

The present disclosure relates to a bucking chute provided with side panels that have a rider clearance portion for aiding in the protection of a rider and/or promoting comfort of the rider while the rider and the animal are in the bucking chute prior to the opening of one of the side panels of the bucking chute. In particular, the present disclosure is directed to a chute that tends to reduce the likelihood of injury to the riders participating in rodeo sporting events such as roughstock events.

BRIEF DESCRIPTION OF THE DRAWINGS

The accompanying drawings, which are incorporated in and form a part of the specification, illustrate the embodiments of the present invention and together with the description, serve to explain the principles of the invention. In the drawings.

DETAILED DESCRIPTION

Figure 1:
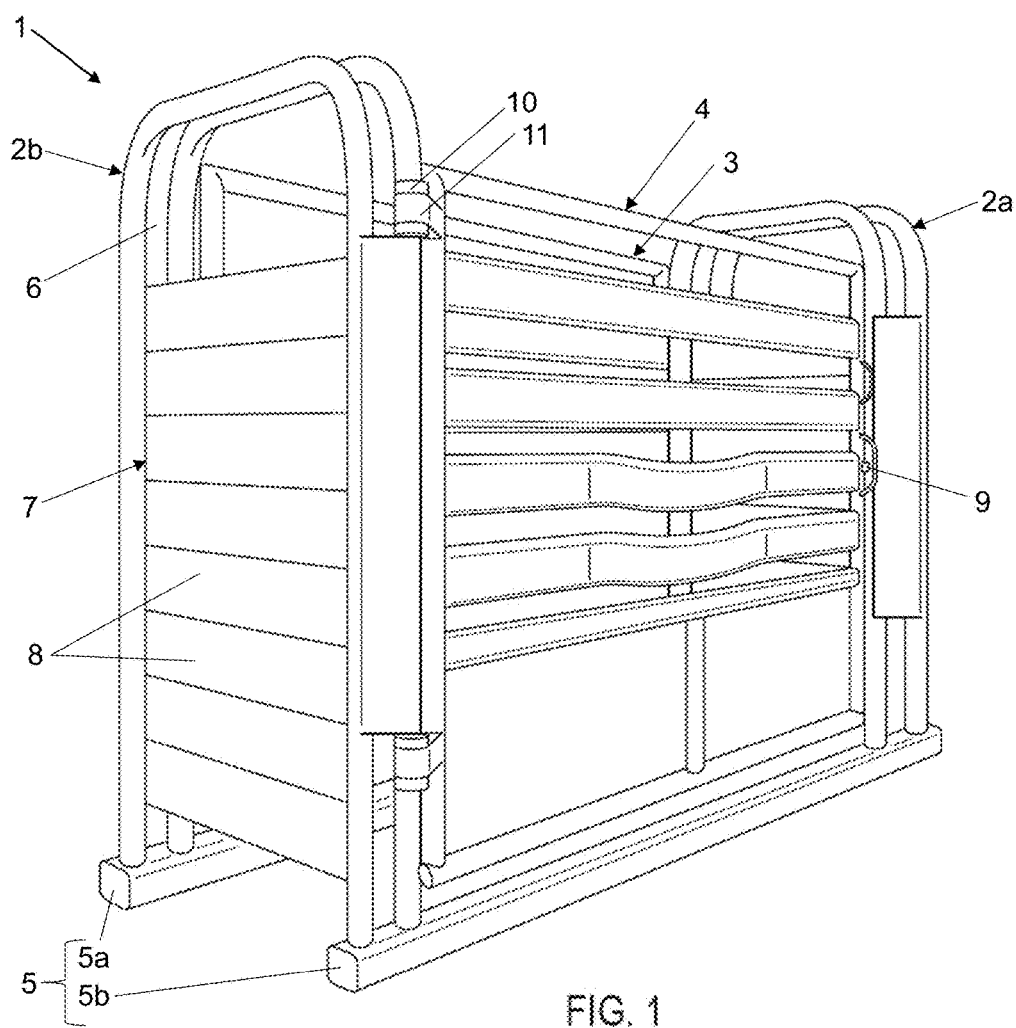
FIG. 1 illustrates a perspective view of a bucking chute of the present invention.
Figure 2:
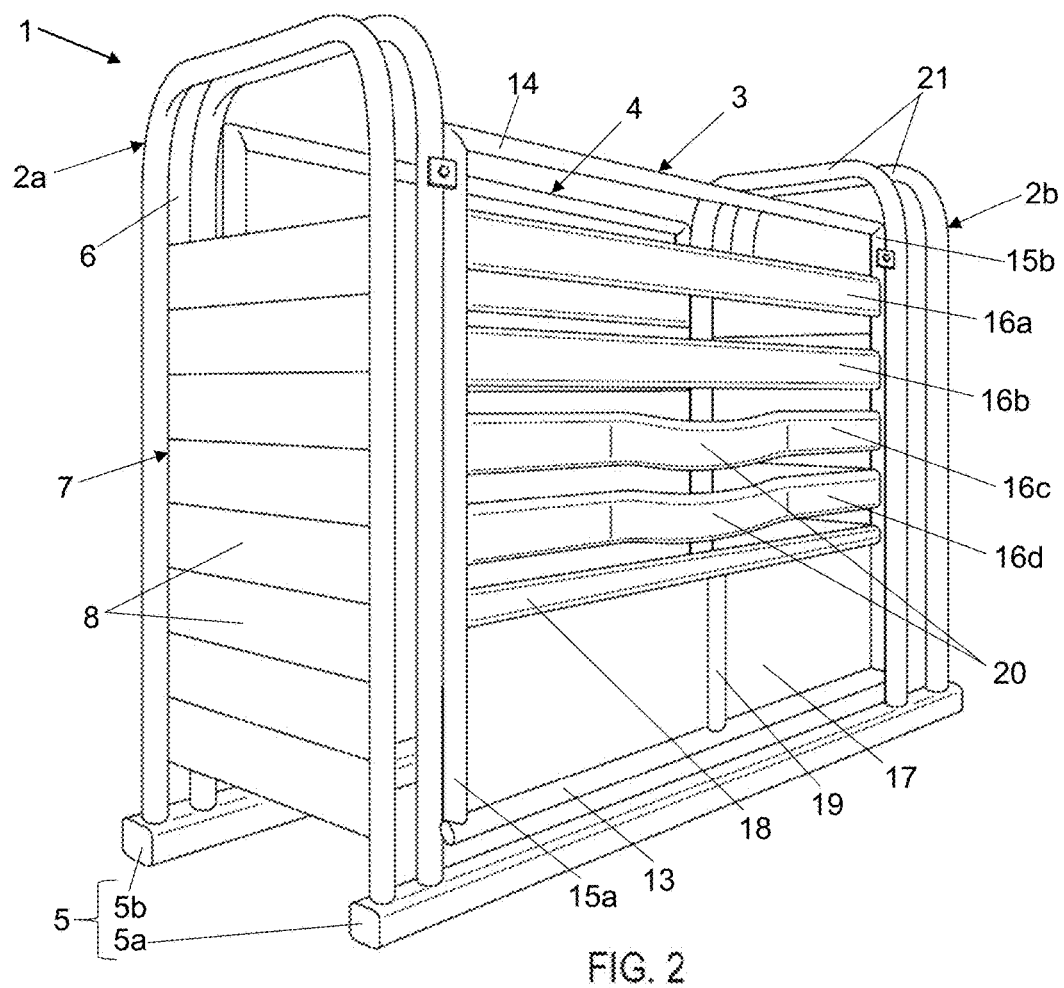
FIG. 2 illustrates a perspective view of the other side of the bucking chute of FIG. 1.

Referring to the accompanying drawings in which like reference numbers indicate like elements, FIGS. 1 and 2 illustrate a preferred embodiment of the present bucking chute. FIGS. 1 and 2 show a standalone configuration of the chute 1, which is comprised of first and second frames (e.g., entry/exit frames at opposing ends of the chute) 2a and 2b, a first side panel 3 between first ends of each of the first and second frames 2a and 2b, and a second side panel 4 (which can be in the form of a rotatable swing gate) between second ends of each of the first and second frames 2a and 2b. The first and second frames 2a and 2b can optionally be connected at bottom ends thereof to a base frame 5, described below.

Each of the first frame 2a and the second frame 2b can be used for entry and/or exit of the rodeo animal into the chute 1 (e.g., depending on the orientation/arrangement of the chute). The frames 2a and 2b can each comprise a generally rectangular body similar to a normal household door frame (e.g., a rectangular frame with a central opening). Each of the first and second frames 2a and 2b can include, for example, left and right side portions and top and bottom portions. In one embodiment, each of the first and second frames 2a and 2b may comprise a bar construction which includes a first arched bar spaced apart from a second arched bar, such that the spacing between the arched bars forms an accommodating space 6 that can accommodate storage of a sliding door/gate 7 therein. Each the first frame 2a and the second frame 2b has a sliding door/gate 7, and the sliding door/gate 7 of each the frame 2a and 2b is configured to be used to block and/or unblock the opening of the corresponding (first or second) frame with respect to entry/exit of the animal into and out of the chute via the corresponding frames.

The sliding door/gate 7 may comprise a frame (not shown), and at least one panel fixed within the frame. For example, in one embodiment, the sliding door/gate 7 can comprise a plurality of panels 8 (stacked one on top of the other, as shown in FIGS. 1 and 2). Of course, the sliding door/gate can alternatively be formed as one large panel, or in a configuration where a bottom panel forms a bottom portion of the sliding door/gate and a plurality of horizontal/vertical/diagonal bars form a top portion of the sliding door/gate. In general, any configuration of panels and/or bars that is capable of being deployed in the accommodating space 6 of the entry/exit frames 2a and 2b for the blocking of an animal from entering/exiting through the opening of the first frame 2a and/or the second frame 2b is a suitable configuration for the sliding door/gate.

The sliding door/gate 7 can thus be designed to be stowed in the accommodating space 6 of the body of the corresponding (i.e., first or second) frame. When the sliding door/gate 7 is received in the accommodating space 6, the corresponding frame (i.e., 2a/2b) is closed. When the corresponding frame is to be opened, the sliding door/gate 7 is substantially pulled out from the accommodating space 6 (although a portion of the sliding door/gate can remain in the accommodating space). Generally, the sliding door/gate 7 needs to be pulled out from the accommodating space 6 to an extent necessary to allow for clean entry/exit of the animal into/out of the frame 2a/2b. Thus, the sliding door/gate 7 is configured to be stowed inside of the accommodating space 6 of the corresponding frame 2a/2b when such frame is intended to be closed, but pulled out from the accommodating space 6 of the corresponding frame 2a/2b when such frame is intended to be open. The sliding door/gate 7 can be configured to be pulled out sideways with respect to the stationary body of the corresponding first or second frame, thereby allowing entry/exit of the animal through the (first or second) frame. At least one handle (not shown) can be connected (e.g., via welding or similar techniques) with the sliding door/gate 7 to assist a user in pulling the sliding door/gate. Any combination of pulleys, wheels, rollers, ball bearings, tracks and/or other similar elements that enable lateral movement can be used in conjunction with the frame of the sliding door/gate to allow for the lateral sliding of the sliding door/gate. Alternatively, the sliding door/gate can be configured as a rolling door/gate capable of being opened and closed in a (vertical) manner similar to how a garage door or a roll-up door is opened and closed, or as a hinged door/gate, or in any similar configuration that allows for opening and closing thereof. In the case of a rolling door/gate, panels that comprise the rolling door/gate would be connected in such a manner that they are capable of being rolled.

In the embodiment shown in FIGS. 1 and 2 where a plurality of panels 8 are used to form a main portion of the sliding door/gate 7, the panels 8 can be formed as an array. The panels 8 can be made of any suitable material (e.g., such as Rumber®, metal, wood or other suitable materials). The panels 8 can be interconnected via at least one common (e.g., vertical) bar (not shown) that can be fastened (e.g., via screws, bolts or any other similar fastener) to each panel, so that the panels are held together integrally, by the bar, and thus capable of being moved all at once. However, any subset of panels of the overall plurality of panels can be connected to one another to allow for sub-arrays of panels (e.g., top and bottom arrays of panels capable of being moved independently of the other).

As is also shown in FIG. 1, the swing gate 4 can be configured with a latch mechanism 9. One of the first frame 2a or the second frame 2b can be configured with a mating latch mechanism (not shown) configured to latch with the latch mechanism 9 of the swing gate 4. For example, the latch mechanism 9 of the swing gate 4 may be a movable (e.g., rotatable) bar or other common latching mechanism, and the latch mechanism of the corresponding first or second frame may be a slot or catch for receiving the latch mechanism 9 of the swing gate 4. FIG. 1 also shows that the other of the first frame 2a or the second frame 2b can be configured with a hinge mechanism 10 that corresponds to a hinge mechanism 11 of the swing gate 4, thereby allowing for rotation of the swing gate 4 about the mated hinge mechanisms 10 and 11.

Figure 3:
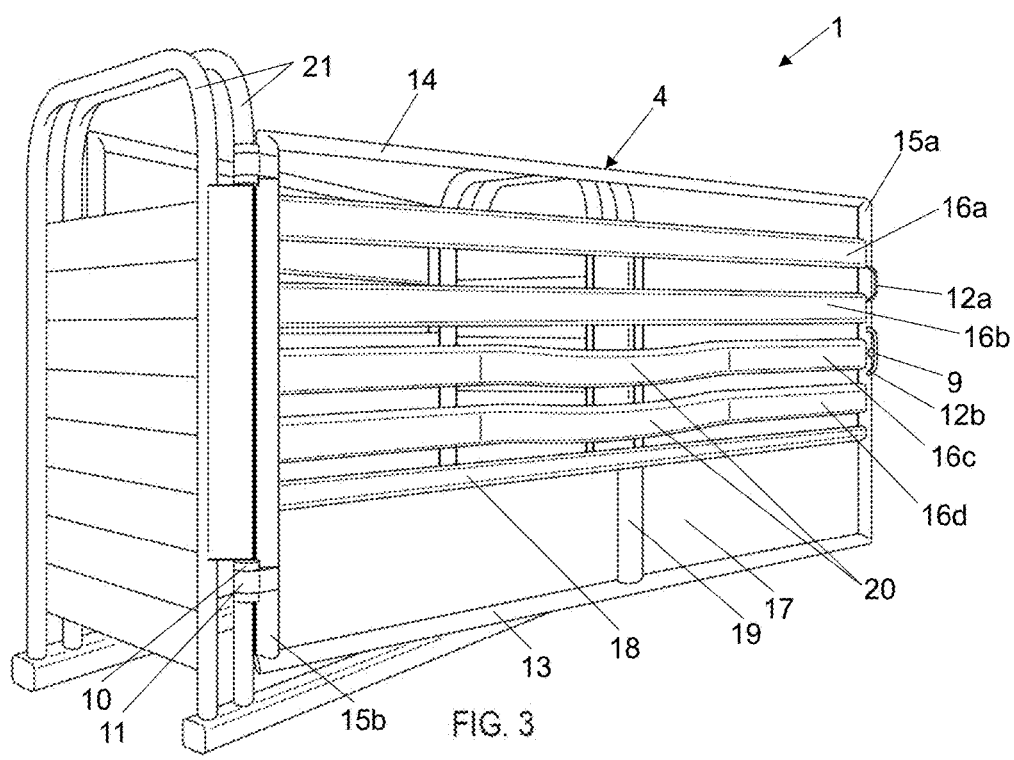
FIG. 3 illustrates the bucking chute of FIG. 1 wherein a side panel has been swung open.

Further regarding the hinge mechanisms 10 and 11, FIG. 3 illustrates the swing gate 4 in an opened state, having been rotated about the hinge mechanisms 10 and 11. The vicinity of the end of the swing gate 4 that includes the latch mechanism 9 can also be configured with at least one handle 12a and/or 12b, to be used for opening and/or closing of the swing gate 4.

FIG. 3 also shows the swing gate 4 comprising a frame including a horizontal base bar 13, a horizontal top bar 14, two vertical side bars 15a and 15b, horizontal rails 16a-16d, a sheet metal panel 17, a horizontal cross bar 18, and a center-mounted vertically-arranged bar 19. Corresponding ends of the various bars 13, 14, 15a and 15b can be connected such that one end of the base bar 13 is connected to one end of vertical bar 15a, and the other end of the vertical bar 15a is connected to one end of the top bar 14, and likewise with respect to the other vertical bar 15b and the other ends of the base bar 13 and the top bar 14, thereby generally forming a square or rectangular-shaped frame (depending on the length of the bars). The connection of the ends of the bars 13, 14, 15a and 15b can, for example, be accomplished via welding, or via a lock-pin, or connected in any other similar fastening/joining technique. The above-mentioned handle(s) 12a and/or 12b of the swing gate 4 can be fixed (e.g., via welding, bolts, or any similar technique) to the vertical bar 15a of the frame of the swing gate 4.

Below the top bar 14 of the swing gate 4 can be the plurality of spaced apart horizontal rails 16a-16d connected to and between the vertical side bars 15a and 15b of the frame. These spaced apart rails 16a-16d generally form a top portion of the overall swing gate 4 (although alternatively the rails 16a-16d of the top portion can be arranged vertically or in any other desired orientation within the overall frame of the swing gate).

A bottom portion of the swing gate 4 below the plurality of rails 16a-16d can be formed with the horizontal cross bar 18 immediately adjacent but below the lowest rail 16d of the top portion of the swing gate 4, and one or a plurality of the panel 17 (e.g., sheet metal plates formed using hot-rolled or cold-rolled techniques, or other common known sheet metal forming techniques) that is/are joined to the base bar 13 of the overall swing gate frame and the horizontal cross bar 18. Additionally, one or a plurality of the vertically-arranged bar 19 can be joined (e.g., via welding or any other similar fastening technique) between the base bar 13 of the overall swing gate frame and the horizontal cross bar 18 (alternatively the bar(s) 19 can be arranged horizontally, diagonally, or in any other desired orientation). For example, as shown in FIG. 3, one vertically-arranged bar 19 can be center-mounted with respect to a center of the panel 17. This center-mounted vertically-arranged bar 19, can, for example, provide structural integrity and/or prevent bowing of the panel 17 of the bottom portion. However, a bar such as the center-mounted vertically-arranged bar 19 is optional and does not have to be provided.

The top portion of the swing gate 4 that includes the plurality of rails 16a-16d may comprise approximately ⅔ of the overall height of the swing gate 4, while the bottom portion including the horizontal cross bar 18 and the panel 17 may comprise the remaining approximately ⅓ of the height of the swing gate 4. Alternatively, the top and bottom portions of the swing gate 4 may each comprise half of the height of the swing gate 4. Any desired ratio of top and bottom portions can be utilized. Further, the swing gate may be comprised substantially of just rails such as rails 16a-16d or just panels such as panel 17 (i.e., such that no dedicated top or bottom portions exist).

The spacing between adjacent rails 16a-16d of the top portion of the swing gate 4 can be set to any desired amount. For example, in the case where the top portion includes four horizontally arranged rails 16a-16d, with the rail 16a being the highest (i.e., farthest from the ground) and the rail 16d being the lowest (i.e., closest to the ground), the spacing between immediately adjacent rails can be as follows: 4.5 inches of space between the rails 16a and 16b, 3.5 inches of space between the rails 16b and 16c, and 3 inches of space between the rails 16c and 16d. However, this spacing arrangement is merely one example of how the rails can be spaced. Any number of spacing combinations can be used.

As shown in FIG. 3, at least one of the plurality of rails of the top portion of the swing gate 4 can be formed to have a clearance portion 20. For example, each of rails 16c and 16d of the top portion of the swing gate 4 can be formed with a clearance portion 20. The clearance portion 20 can be formed by bending, pulling, extruding and/or otherwise mechanically forming the rail in a bulged manner at its center, or by forming the rail in a continuous bowed/arched configuration from end to end, or by forming the rail as a plurality of segments that are connected together to form a bowed configuration. The segmented rail can, for example, have a first straight portion having one end thereof connected to the vertical bar 15a, and a second straight portion having one end thereof connected to the vertical bar 15b, with a bowed portion connected between the other ends of the first and second straight portions, to thereby form the clearance portion. These segments can be connected together by welding or a similar technique, or via fasteners.

Alternatively, instead of the clearance portion having a bowed configuration, the clearance portion can be formed in a rectangular shape. Such a rectangular-shaped clearance portion may be realized using a five-segment rail. For example, five straight pieces of rail can, for example, be welded together to form a bulged rail of the top portion of the swing gate. The five-segment rail can comprise, from left to right, a first straight portion, a second straight portion generally orthogonal to the first straight portion, a third straight portion generally parallel to the first straight portion and orthogonal to second straight portion, a fourth straight portion analogous to the second straight portion, and a fifth straight portion generally analogous to the first straight portion, thereby forming a rail with a centrally-located rectangular-shaped bulged portion that serves as the clearance portion. Of course, the shape of the clearance portion of the rail is not limited to being in a bowed or rectangular shape, and can be in any shape that provides the necessary clearance space for the legs of the rider.

The side panel 3 can have substantially identical top and bottom portions (i.e., a substantially identical rail and panel construction) as the swing gate 4, except without the hinge mechanism 11, the latch mechanism 9 and the handle(s) (12a and/or 12b) of the swing gate 4. This is because the side panel 3 is generally not intended to be opened. As such, the side panel 3 can, for example, be welded and/or bolted at one end to the first frame 2a, and welded and/or bolted at the other end to the second frame 2b. Of course the side panel 3 can have a different rail/panel construction than the swing gate 4, and can, if desired, be configured to rotate about a hinge and latch in a similar manner as the swing gate 4.

Regardless of the particular configuration of the side panel, as shown in FIG. 2, the side panel 3 generally includes a matching frame construction as that of the swing gate 4, including top bar 14, vertical side bars 15a and 15b, spaced apart rails 16a-16d, panel 17, cross bar 18, and vertical bar 19, with each of rails 16c and 16d of the side panel 3 including a clearance portion 20.

Figure 4:
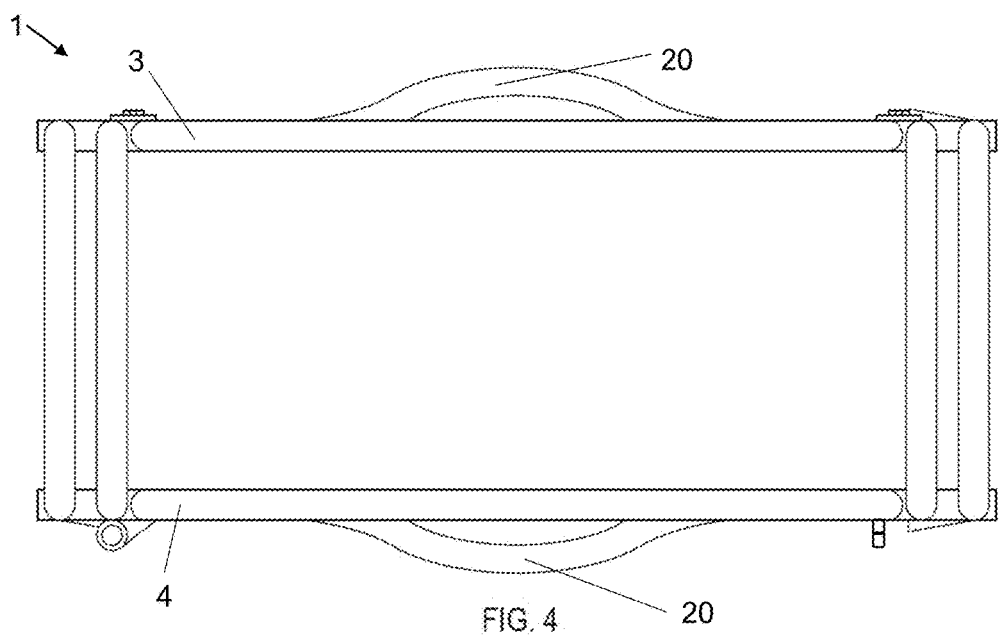
FIG. 4 illustrates a top view of the bucking chute of FIG. 1.

In view of the components that are common in both side panel 3 and swing gate 4, the top view shown in FIG. 4 shows a generally symmetrical design with respect to the clearance portions 20 on each of side panel 3 and swing gate 4, thereby providing clearance space for each leg of the rider. The clearance portions 20 of the swing gate 4 provide clearance space for one leg of the rider, and the clearance portions 20 of the side panel 3 provide clearance space for the other leg of the rider. Thus, when the rider is mounted on the animal inside of the chute 1, both legs of the rider (which are generally draped over opposite sides of the animal) have corresponding clearance space to reside in.

Thus, the clearance portions 20 of the bulged rails 16c and 16d (either in a bowed or rectangular configuration) on each side panel of the chute 1 provide clearance space inside of the chute 1 for the legs of the rider while the rider is mounted on the animal. By way of these clearance portions 20, should the animal buck and/or move quickly toward one side or the other inside of the chute 1, the legs of the rider have a reduced risk of being injured from getting pinned between the body of the animal and the sides of the chute 1. That is, in such a scenario, the body of the animal will generally impact the non-bulged straight portions of the rails 16c and 16d, while the legs of the rider are safely within the clearance space provided by virtue of the shape of the clearance portions 20 of the rails. Thus, the likelihood of the rider's legs being pinned between the body of the animal and the sides of the chute 1 is greatly reduced. This is a significant advantage over conventional bucking chutes, improving the safety of both the rider and the animal. The figures herein show two rails of each of the swing gate 4 and the side panel 3 having the clearance portion, but of course only one rail or more than two rails of the swing gate 4 and side panel 3 can have the bulged configuration. Even parts of the bottom portion(s) of the swing gate 4 and side panel 3, such as the cross bar 18, can be formed in the bulged configuration. The primary consideration with respect to determining the extent, amount and location of bulged portions of the swing gate and side panel is to ensure adequate clearance space for the legs of riders that will be mounted on animals inside of the chute.

Referring back to FIGS. 1 and 2, the optional base frame 5 may comprise two parallel ground frame bars 5a and 5b (e.g., one bar 5a for connecting bottom portions of each of the first ends of the first and second frames 2a and 2b, and the other bar 5b for connecting bottom portions of the second ends of the first and second frames 2a and 2b). The two parallel ground frame bars 5a and 5b may be configured to rest on the ground, and be fixed (e.g., via welding, a lock-pin type assembly, or any other similar fastening/joining technique) between the ends of the first and second frames 2a and 2b, thereby improving the stability and structural integrity of the overall chute 1.

For example, one ground frame bar 5a can be arranged as part of the side of the chute 1 with side panel 3, and the other ground frame bar 5b can be arranged as part of the side of the chute 1 with swing gate 4. The ground frame bars 5a and 5b can be arranged parallel to one another, and separated by distance that is generally equivalent to a width of the overall chute 1.

Additionally, the chute 1 can be configured with a protective cover (not shown) that is designed to cover a top portion 21 of each of the first and second frames 2a and 2b, as shown in FIGS. 2 and 3. This cover can provide additional protection to the rider should the animal buck the rider forward or backward while inside of the chute, and can, for example, be formed as a sheet metal cap (similar in form to a chimney cap) to cover the top portions 21 of the first/second frames 2a and 2b. This cover can alternatively be formed as a protective padding material that can be draped over the top portions 21 (and be attached to the respective frame via corresponding fastening straps or other similar attachment mechanisms). A combination of the sheet metal cap and the padding can also be used as the protective cover.

The chute can be arranged in a left-hand or right-hand orientation. Further, instead of being configured as a stand-alone chute with opposing entry/exit frames at each end thereof, the chute can be configured as an add-on chute. For example, when configured as an add-on chute, only one end of the chute may be configured with an entry/exit frame. The other end of the chute is left in a configuration that allows for connection with an adjacent chute. For example, the end of the base frame ground bars that would normally be connected to an entry/exit frame in the standalone configuration are left exposed, so that they can be joined (e.g., by way of lock-pins or other similar fastening techniques) to a frame of a separate chute. The add-on chute can be configured in a left-hand or right-hand orientation, depending on configuration requirements.

Additionally, a plurality of bucking chutes (either in standalone configuration or add-on configuration) can be arranged close to one another to form a series of chutes, or directly connected to one another in series via corresponding fastening mechanisms on adjacent chutes. Alternatively, the plurality of chutes can be integrally formed with one another (e.g., in a manner such that the chutes are not generally separable from one another). Regardless of the exact type of chute and/or the particular arrangement of chutes, the swing gate and side panel of each chute should have rails with matching clearance portions to provide clearance space for the legs of the riders that will be inside of the various chutes.

The various parts of the chute may be made of metal (such as steel or any like material), in any variety of suitable sizes and dimensions. The metal parts may comprise steel pipes/tubes/slats of various length, width and/or diameter, or sheet metal of various gauge. For example, if steel tubes are used, the tubes can have any suitable outer diameter and wall thickness. The metal parts may be made of any suitable gauge of steel, such as, but not limited to, 8-gauge steel to 14-gauge steel. Or course other suitable metals and even non-metal materials can be used. For example, as discussed above, panels of the sliding door/gate may be comprised of Rumber®. The metal parts can also be finished with a powder coat finish. The powder coat finish may include UV inhibitors. Such a finish improves the look and last of the parts. The chute may be constructed in such a manner so as to comply with the rules and/or specifications of the Professional Rodeo Cowboys Association (PRCA), the Cowboy's Professional Rodeo Association (CPRA) (e.g., which requires at least 28 inches of clearance inside the chute), and/or Professional Bull Riders Inc. or similar associations/organizations.

As discussed above, the components (e.g., panels, gates, rails, bars, etc.) of the chute may be coupled together by fasteners and/or coupling mechanisms such as pins, bolts, latches, hinges and any other similar fasteners and/or coupling mechanisms, and/or may be fixed in a more permanent fashion by way of welding and other similar metal-working techniques. Embodiments that use pins and/or bolts would have corresponding holes to receive the pins and/or bolts, as needed.

In view of the foregoing, it will be seen that the several advantages of the invention are achieved and attained. The embodiments were chosen and described in order to best explain the principles of the disclosure and their practical application to thereby enable others skilled in the art to best utilize the various embodiments and with various modifications as are suited to the particular use contemplated. As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

It should also be understood that when introducing elements of the present invention in the claims or in the above description of exemplary embodiments of the invention, the terms "comprising," "including," and "having" are intended to be open-ended and mean that there may be additional elements other than the listed elements. Additionally, the term "portion" should be construed as meaning some or all of the item or element that it qualifies. Moreover, use of identifiers such as first, second, and third should not be construed in a manner imposing any relative position or time sequence between limitations. Still further, the order in which the steps of any method claim that follows are presented should not be construed in a manner limiting the order in which such steps must be performed, unless such an order is inherent or explicit.

What is claimed is:

1. A panel adapted and configured to be mounted on a bucking chute, wherein the bucking chute is configured to receive therein a rider mounted on top of an animal and wherein the bucking chute includes a first chute end frame and a second chute end frame opposite the first end frame, the panel comprising:
    a panel first end and an opposite panel second end spaced from the panel first end along a length of the panel; and
    a plurality of rails between the panel first end and the panel second end, at least one rail of the plurality of rails including a clearance portion that extends outwardly with respect to a plane defined by an outer surface of the panel first end and an outer surface of the panel second end, wherein the panel is configured to be attached to one of the first and second chute end frames in a manner such that when the panel first end is adjacent to the first chute end frame and the panel second end is adjacent to the second chute end frame, the clearance portion forms a clearance space to accommodate a leg of the rider while the rider is mounted on the top of the animal within the bucking chute.

2. The panel claim 1, wherein the clearance portion of the at least one rail is centered between the panel first end and the panel second end.

3. The panel of claim 1, wherein the clearance portion comprises one of a curved shape and a rectangular shape.

4. The panel of claim 1, wherein the first end of the panel includes a hinge mechanism, and the panel is configured to rotate about the hinge mechanism between an open position and a closed position relative to the first chute end frame when the panel is hingedly attached to the bucking chute.

5. The panel of claim 4, wherein the second end of the panel includes a latch mechanism adapted to releasably connect the second end of the panel to the second chute end frame when the panel is hingedly attached to the bucking chute.

6. The panel of claim 1, wherein:
    the panel comprises one of a first gate and a second gate different from the first gate, the first gate being adapted and configured to be hingedly attached to a first side of the first and second chute end frames, and the second gate is configured to be hingedly attached to a second side of the first and second chute end frames opposite the first side of the first and second chute end frames;
    the clearance portion comprises a first clearance portion of the first gate and a second clearance portion of the second gate; and
    when the first and second gates are in a closed position relative to the first and second sides of the first and second chute end frames, respectively, the first and second clearance portions form a clearance space configured to accommodate legs of the rider while the rider is mounted on the top of the animal within the bucking chute.

7. A gate adapted and configured to be mounted on a bucking chute, wherein the bucking chute is configured to receive therein a rider mounted on top of an animal and the bucking chute has a first chute end frame and a second chute end frame opposite the first chute end frame, the gate comprising:
    an upper portion and a lower portion, the upper portion having chute end frame adjoining portions and a clearance portion between the chute end frame adjoining portions, the chute end frame adjoining portions defining a plane parallel to the lower portion, the clearance portion extending laterally outward relative to the chute end frame adjoining portions and the lower portion; and
    a hinge portion mounted on one of the chute end frame adjoining portions, the hinge portion being adapted and configured to be hingedly connected to the first chute end frame;
    wherein when the hinge portion is attached to the first chute end frame, the gate is movable between a closed position and an open position relative to second chute end frame,
    wherein in the open position, the gate is configured to be pivoted away from the second chute end frame and provide a space between the other of the frame adjoining portions and the second chute end frame, and
    wherein in the closed position, the lower portion and frame adjoining portions define a plane perpendicular to the first and second chute end frames.

8. The gate of claim 7 wherein the upper portion comprises a plurality of horizontal bars spaced apart from one another.

9. The gate of claim 8 wherein the clearance portion is one of a curved portion and a rectangular-shaped portion of at least one horizontal bar of the plurality of horizontal bars.

10. The gate of claim 7 wherein the lower portion comprises a sheet of material.

11. The gate of claim 10 wherein the lower portion further includes a vertical bar.

12. The gate of claim 7, wherein:
- the gate comprises a first gate and a second gate different from the first gate, the first gate is configured to be hingedly attached to a first side of the bucking chute, and the second gate is configured to be hingedly attached to a second side of the bucking chute opposite the first side of the bucking chute;
- the clearance portion comprises a first clearance portion of the first gate and a second clearance portion of the second gate; and
- when the first and second gates are in a closed position relative to the first and second sides of the bucking chute, respectively, the first and second clearance portions form a clearance space configured to accommodate legs of the rider while the rider is mounted on the top of the animal within the bucking chute.

* * * * *